Patented Oct. 7, 1941

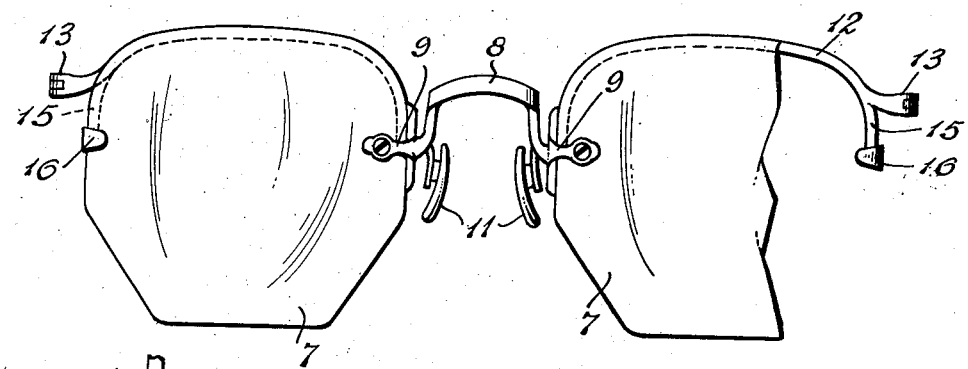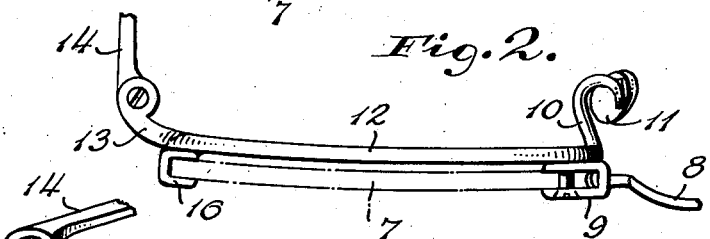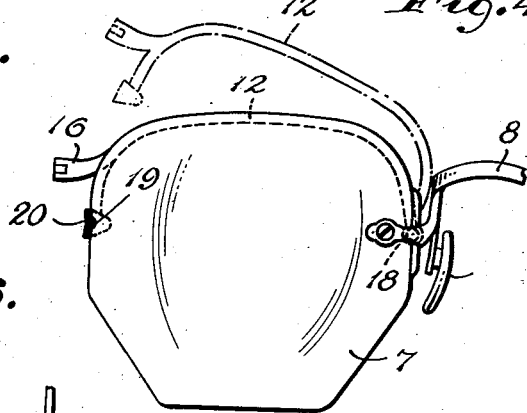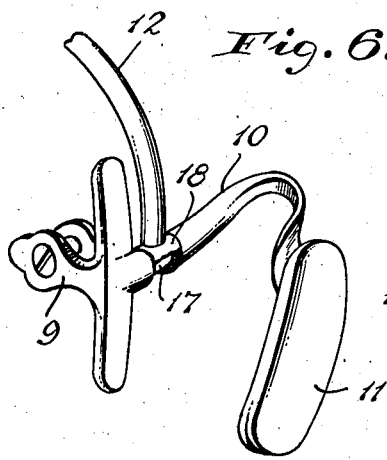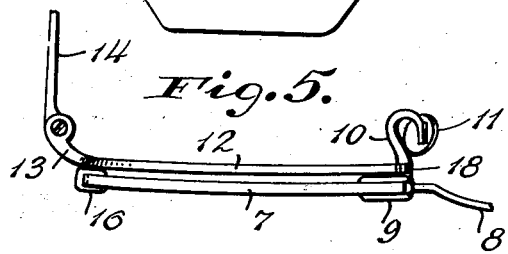

2,257,811

UNITED STATES PATENT OFFICE 2,257,811

OPHTHALMIC MOUNTING

Jacob J. Pomeranz, Brooklyn, and Vincent Tanasso, Harrison, N. Y.

Application February 19, 1940, Serial No. 319,592

2 Claims. (Cl. 88—47)

This invention relates to improvements in ophthalmic mountings and has particular reference to that type in which members of the frame, usually referred to as brow arms, extend along the upper edges and to the rear of the lenses.

Mountings of this type have been provided wherein the brow arms, at their outer ends, are unattached to the lenses and terminate in end pieces to which temples are secured. Such constructions have the drawback that the undue relative lateral movements which occur between the lenses and arms in the handling of the eyeglasses, sometimes results in the bending of said arms or the placing of excessive strain upon the lenses at their points of attachment to the frame adjacent the inner ends of said arms.

The present invention is designed to overcome the above difficulty, by providing the outer end of each brow arm with a lens engaging portion, in the form of a clip or its equivalent, which is freely engaged with a lens in such manner that relative lateral movements between said lens and brow arm will be prevented.

The invention further contemplates an improved construction of brow arm in which the same is pivotally mounted upon a part of the frame for swinging movements toward and away from its operative position behind the associated lens, and in which said arm is provided with a lens-engaging clip having free contact with opposed surfaces of said lens to prevent lateral movements between the lens and arm when the latter is in its operative position.

The inventive idea involved is capable of receiving a variety of mechanical expressions, some of which are shown in the accompanying drawing wherein:

Figure 1 is a front elevation of an ophthalmic mounting constructed in accordance with the invention.

Figure 2 is an enlarged fragmentary top plan view thereof.

Figure 3 is a fragmentary perspective view of a portion of the mounting shown in Figures 1 and 2.

Figure 4 is a fragmentary front elevation of another form of mounting wherein the brow arm is adjustable relative to its associated lens.

Figure 5 is a top view of the portion of the mounting shown in Figure 4, and

Figure 6 is a fragmentary perspective view illustrating the pivotal mounting of the brow arm.

Referring more particularly to Figures 1 to 3, numeral 7 indicates lenses which are carried by the frame or mounting that consists of a bridge 8 to the ends of which are soldered or otherwise secured the lens straps 9 having the lenses secured thereto in the customary manner. Extending rearwardly from the straps 9 are the pad arms 10 having the usual nose pads 11 mounted on the free extremity thereof.

At a point adjacent the front end of the pad arm 10 and rearwardly of the associated lens strap 9, said arm has extending upwardly therefrom the curved brow arm 12, the curvature of which conforms to that of the upper edge of the adjacent lens 7. Said brow arm 12 extends in a plane to the rear of the lens 7 and in slightly spaced relation thereto. Adjacent the outer extremity of the arm the same is divided to form a rearwardly projecting end piece 13 to which the front end of the temple 14 is pivotally connected in the usual manner, and to further form an extension 15 of the brow arm which is also disposed to the rear of the lens 7 in spaced relation thereto. This extension 15 may be of any length desired so that it will terminate either above or below the horizontal axis of the lens, and is utilized to carry a means which is freely engageable with the lens to act to retain said lens against lateral movement with respect to the brow arm. Said means is preferably in the nature of a U-shaped clip formed at the extremity of the extension 15 and disposed forwardly of the plane of the brow arm so that the edge of the lens may be received in the clip with the latter having its two wings freely engaged with the opposed outer and inner surfaces of the lens. The space between the wings or sides of the clip 16 is equal to the thickness of the lens so that when the latter is engaged in said clip any lateral shifting between the lens and the brow arm will be prevented as long as said arm is in its normal position extending along the upper edge of the lens. Should it be desired to release the lens from the clip 16 it is only necessary to lift the brow arm slightly to disengage said clip and a reversal of this movement will cause the clip to again engage the lens due to the resiliency of the material of which the brow arm is made.

In the form of the invention shown in Figures 4 to 6, provision is made for pivotally mounting the brow arm in a plane substantially parallel to that of the lens, as indicated in the dotted line position of Figure 4. This pivotal mounting of the brow arm permits of thorough cleansing of the lens, particularly along the upper edge thereof where some difficulty may be experienced in cleaning the rear surface of the lens if the arm were not capable of being moved away from the lens as indicated. For the purpose of pivotally mounting the brow arm, it is found preferable to employ the portion of the associated pad arm 10 adjacent the lens strap 9. Thus, the arm 10 may be reduced in diameter as indicated at 17 to form a bearing for the sleeve 18 carried by the inner end of the brow arm 12, said sleeve being fitted upon the arm 10 so that the arm 12 will be capable of swinging about the horizontal axis of said arm 10 and thus in a plane substantially parallel to that of the associated lens.

In this construction involving the pivotal mounting of the brow arm, means are provided for releasably retaining the outer end of the arm in engagement with the lens 7. This is preferably accomplished by providing the edge of the lens with a small notch or indentation 19 which is adapted to receive a similarly formed projection 20 extending from the inner surface of the bight of the clip 16. The notch and projection provide a means for frictionally retaining the brow arm in its normal or operative position relative to the lens and due to the free engagement of the clip 16 with said lens, it is apparent that the brow arm may be swung upwardly about its pivot by exerting a slight pressure upon the end piece 13 sufficient to disengage the projection 20 from its notch.

What is claimed is:

1. In an ophthalmic mounting, a bridge for a pair of lenses, pad arms carried by said bridge, brow arms extending along the rear edge of each lens and each having a sleeve at its inner end embracing one of said pad arms to form a pivotal mounting for said brow arm, the outer extremity of each arm having an end piece for attachment to a temple, an extension for said arm projecting beyond said end piece in the direction of the contour of the edge of the associated lens and having a clip loosely straddling said lens, said clip and lens having interengaging means to releasably retain said arm against pivotal movement.

2. In an ophthalmic mounting, a bridge for a pair of lenses, lens straps carried by said bridge, brow arms extending to the rear of said lenses and each provided at its inner end with a pivotal mounting, a bearing for said mounting whereby said arm is capable of vertical movement relative to its associated lens, the outer portion of each arm being divided to form a rearwardly directed end piece for attachment to a temple and to further form a downwardly directed temporal extension providing a continuation of the brow arm below said end piece, the lower end of said extension terminating approximately opposite said lens strap, and a lens clip carried by and arranged forwardly of the lower end of said extension for straddling engagement with a lens.

JACOB J. POMERANZ.
VINCENT TANASSO.